May 19, 1970  J. SCHWARTZ  3,513,313
RADIATION DETECTION APPARATUS
Filed Dec. 6, 1968  2 Sheets-Sheet 1

INVENTOR.
JACOB SCHWARTZ
BY Robert Helen Epps
AGENT

INVENTOR.
JACOB SCHWARTZ

United States Patent Office 3,513,313
Patented May 19, 1970

3,513,313
RADIATION DETECTION APPARATUS
Jacob Schwartz, Arlington, Mass., assignor to Sanders Associates, Inc., Nashua, N.H., a corporation of Delaware
Filed Dec. 6, 1968, Ser. No. 781,870
Int. Cl. G01j 1/44
U.S. Cl. 250—83.3                 3 Claims

ABSTRACT OF THE DISCLOSURE

An improved radiation detection device in which a two phase detector element that undergoes a phase transition is response to a temperature change is employed. The detector is placed in a temperature regulator circuit that provides a thermal bias via a feedback loop such that a preselected extensive thermodynamic variable is maintained substantially constant and the effects of hysteresis are substantially eliminated from the output of the apparatus.

BACKGROUND OF THE INVENTION

Field of the invention

The present invention relates generally to the field of thermodynamics and in particular to apparatus for measuring properties of radiant energy by monitoring a preselected extensive variable of a thermodynamic system.

DESCRIPTION OF THE PRIOR ART

Prior to the present invention apparatus has been available for the measurement of temperature by monitoring the magnetic permeability of a material which is exposed to radiant energy. Typical of such apparatus is that disclosed in U.S. Pat. No. 2,222,425 which issued to Herman G. Wehe on Nov. 19, 1940. This apparatus operates to detect a change in the permeability of a magnetic material which is subjected to heating. The primary drawback of this type of apparatus, however, is the hysteresis which is exhibited by the magnetic material, in the Curie region of the temperature-permeability characteristic of a given magnetic material; i.e. that portion of the temperature-permeability curve where a small change in temperature results in a large change in permeability. The effect of hysteresis is to render the relationship between magnetic permeability and temperature ambiguous. At low signal levels this ambiguity may make calibration of the apparatus difficult if not impossible. It is also well known that ferro-electric crystals also often exhibit domain structure hysteresis which renders the relationship between dipole moment and temperature ambiguous.

OBJECTS AND SUMMARY OF THE INVENTION

It is therefore a primary object of the present invention to provide new and novel apparatus for the measurement of radiant energy.

It is another object of the present invention to provide apparatus of the above-described character having a two phase detector element exhibiting a phase transition response to a temperature change.

It is a further object of the present invention to provide apparatus of the above-described character which is substantially independent of hysteresis effects.

It is an additional object of the present invention to provide apparatus of the above-described character which is operable at low signal levels.

It is yet another object of the present invention to provide apparatus of the above-described character which is regulated to operate in its most sensitive region.

The foregoing as well as other objectives are accomplished through the practice of the present invention wherein there is provided a two phase detector element which undergoes a phase transition with a change in the temperature thereof and upon which the radiant energy to be measured is caused to impinge. The detector is heat biased to a preselected level substantially in the center of its phase transition characteristic such that by regulating the heat input to the detector such that an extensive thermodynamic variable of the detector is maintained substantially constant the ambiguities due to hysteresis which are normally associated with Curie region phase transitions are substantially avoided. A feedback loop is provided to control the heat applied to the detector to maintain the temperature thereof at the bias point. The amount of heat required to maintain the detector at the thermal bias point is correlated into an output voltage which after suitable signal processing is indicative of the power and/or energy of the radiant energy impingent upon the detector element.

These and other objects, features and advantages of the present invention will become more apparent from the detailed discussion taken in conjunction with the appended drawings. The scope of the invention will be indicated in the claims.

DESCRIPTION OF PREFERRED EMBODIMENT

For the purposes of illustration the present invention will be described herein with reference to a magnetic embodiment. It is to be understood, however, that a pyromagnetic detector element is merely one embodiment of a two phase detector which undergoes a phase transition in response to a variation in an extensive thermodynamic variable induced by an inflow of heat. Other embodiments within the contemplation of the present invention will be discussed more fully hereinbelow.

Figure 1:
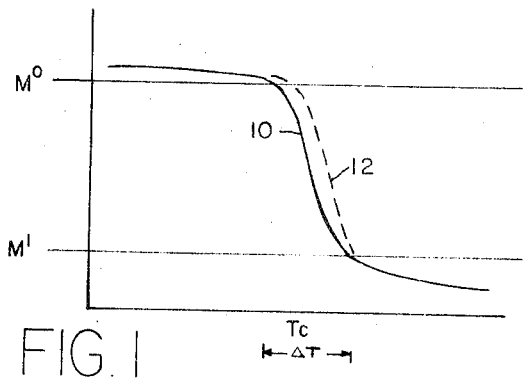
FIG. 1 is a typical temperature-magnetization graph for a material with a metamagnetic phase transition in response to temperature change.

Turning now to FIG. 1 there is illustrated a graph of magnetization M versus temperature T for a typical material having a metamagnetic phase transition. Any material which undergoes a magnetic phase transition is characterized by a relation between magnetization and temperature of the form shown by curve 10. The critical phase transition temperature is $T_c$. It is clear that in the immediate vicinity of the temperature $T_c$, the slope $\Delta M/\Delta T$ of the curve 10 is at a maximum. There is, however, a hysteresis characteristic 12, which depends upon whether the temperature is increasing or decreasing. Mathematically, this hysteresis characteristic implies that there is not a unique functional relation between magnetization and temperature in the vicinity of $T_c$. As a practical matter this characteristic means that within the temperature range $\Delta T$, so-called, the Curie region the measurement of temperature is not necessarily a valid indication of the value of magnetization and vice versa.

Figure 2:
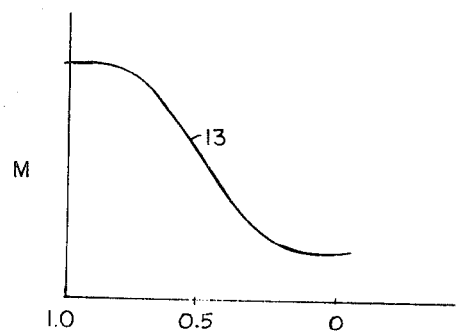
FIG. 2 is a graph illustrating magnetization as a function of phase fraction.

It has been discovered by the applicant that within the temperature range $\Delta T$ there exists an additional variable which correlates well with magnetization in both the mathematical and physical sense and which may be used to advantage in practical radiation measuring devices. This variable X herein termed the phase fraction is defined as the fraction of the material in the ferromagnetic phase. The most important property of the phase fraction is that it has a single-valued, monotonic relationship with magnetization although not with respect to temperature. This relationship is illustrated as curve 13 in FIG. 2. According to the thermodynamics of phase transitions for values of the phase fraction X between zero and 1.0, X is uniquely related to change in enthalpy. For temperatures below the Curie region of FIG. 1 the value of the phase fraction is 1.0; for temperatures above the Curie region the phase fraction is equal to zero.

If the magnetic material is presumed to have a phase fraction equal to 0.5, the inflow of heat into the material may be established by $$\Delta Q = \frac{-mL}{\left(\frac{\Delta M}{\Delta X}\right)} \Delta M \quad (1)$$

where:

M is the total magnetization of the material;
$\Delta Q$ is the heat flowing into the material;
m is the mass of the material;
L is the latent heat function of the material which is substantially constant for any given material; and
$(\Delta M/\Delta X)$ is the effective slope of the curve 13 of FIG. 2 which is linear over a substantial range of values of X.

The result of Equation 1 is a monotonic, substantially linear relationship between the net heat inflow to the material and the change in the magnetization thereof. This change in magnetization may be monitored by any one of a variety of magnetometric techniques known in the art and is independent of any hysteresis effects in the temperature-permeability relationship of FIG. 1. The other factors of Equation 1 are essentially constant and readily measurable.

Figure 3:
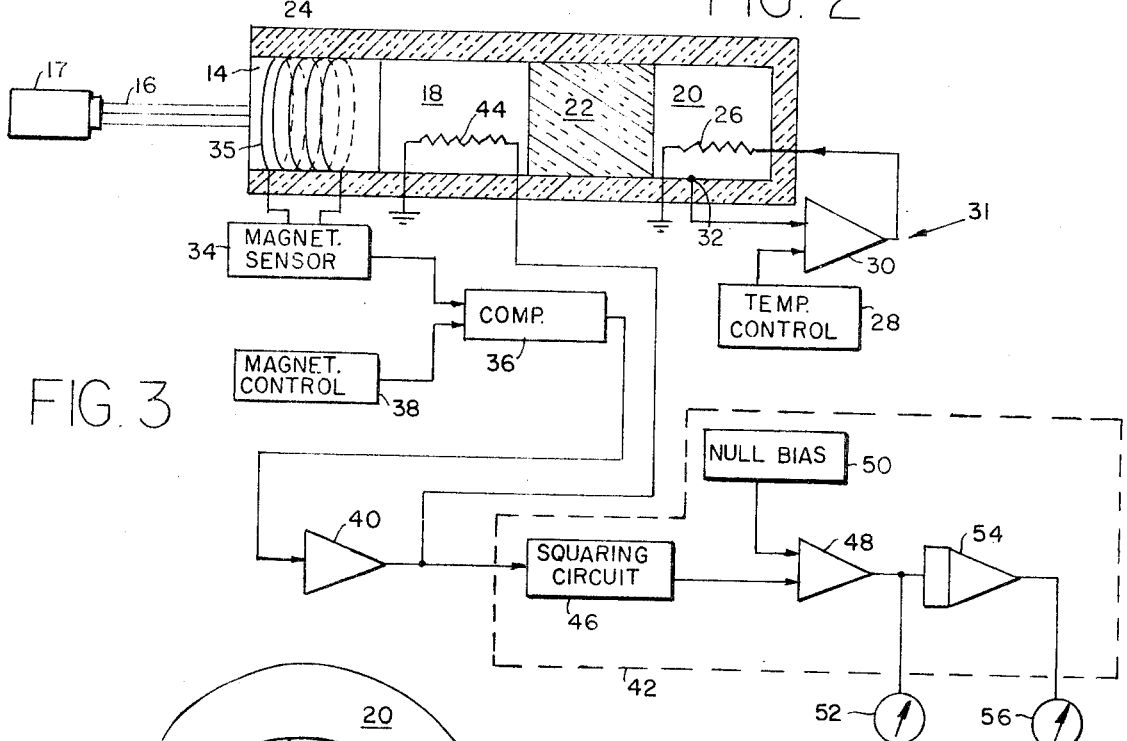
FIG. 3 is a schematic illustration of one embodiment of the present invention.

The applicant has further conceived apparatus for applying the relationship of Equation 1 to radiation sensing devices of practical utility. It will be apparent that the greatest sensitivity of the magnetic material occurs when $(\Delta M/\Delta X)$ is at a maximum. It will further be seen from FIG. 2 that this condition is met when the phase fraction X is equal to 0.5. This desired quiescent operating point may be attained by providing a detector element having a metamagnetic phase transition in a temperature regulating circuit which provides a thermal bias to the detector. In this manner the magnetization of the detector is maintained at a value corresponding to a phase fraction of 0.5. Apparatus for accomplishing this is schematically illustrated in FIG. 3 wherein a pyromagnetic detector element 14 is disposed in the path of radiation energy 16, from a remote source 17. Disposed adjacent the detector 14 and in heat transfer relation therewith is an auxiliary heating means 18, the function of which will be more fully discussed hereinbelow. A primary heating means 20 is separated from the auxiliary heating means 18 by a layer 22 of insulation. The detector 14 and the auxiliary and primary heating means 18 and 20 respectively are surrounded except for the radiation incident portion of the detector 14 by a layer of insulation 24.

The primary heating means 20 may be for example a resistance heater of the type known in the art. The electric current through the resistance element 26 may be applied from a variable power supply 28 through a differential amplifier 30. A temperature sensor 32 may be disposed adjacent the resistance element 26 and have its output coupled to the differential amplifier 30 thus forming a bias temperature control means 31 whereby the bias temperature of the detector element 14 may be selected and maintained.

Coupled to the detector element 14 is a magnetization sensor 34, the coil 35 of which provides an output voltage in response to a change in the magnetization of the detector which results from the incidence of radiant energy thereupon. The output of the sensor 34 is coupled to a comparator means 36 where it is compared with the output of an adjustable magnetization reference source 38. The comparator output is then coupled through an amplifier 40 to the auxiliary heating means 18 and to signal processing electronics 42.

The auxiliary heating means 18 may in the same manner as the primary heating means comprise a resistance heating element 44 and in the absence of input radiation has current applied thereto, thus contributing to the maintenance of the detector element at a preselected phase fraction. The output of the amplifier 40 is an electric current which is representative of the magnitude of the change in magnetization which is undergone by the detector element 14 in response to incident radiant energy 16. By coupling the amplifier 40 output current to the auxiliary heating means 18 a thermal feedback loop is completed. Being a nulling technique this feedback loop relates the amplifier 40 output to the input radiation 16 by maintaining the detector 14 at substantially constant phase fraction for periods of time at least of the order of several seconds. This is accomplished in a negative manner by reducing the current through the auxiliary heating means 18.

As stated above, the output of the amplifier 40 representing the change in magnetization of the detector 14 due to impingent radiation is also coupled to signal processing electronics 42. The signal processing electronics operate upon the output of amplifier 40 such as to provide output signals which are representative of the characteristic of the impingent radiant energy 16 which are desired to be measured. In one embodiment the signal processing electronics 42 may comprise a squaring circuit 46, the output of which represents the square of the current output of amplifier 40. The squaring circuit 46 output may be coupled to a differential amplifier 48 together with the output of an adjustable bias means 50. The adjustable bias means 50 provides means for nulling out any signal which is present when the detector 14 is in a quiescent condition; i.e. when no radiant energy is incident thereon. The output of the different amplifier 48 is representative of the difference between the squares of the output current from amplifier 40 and the quiescent current and thus is directly proportional to the power of the radiant energy incident upon the detector 14. The output of the differential amplifier 48 thus may be coupled to a power indication means 52. If the output of amplifier 48 is also coupled to an integrating amplifier 54 the integral of the incident radiation 16 with respect to time, or radiant energy is provided. Thus the output of the integrating amplifier 54 may be coupled to an energy indicating means 56. It will be apparent that in cases where the input radiation 16 is of a continuous or steady state nature the power indication means 52 is preferred; in cases of pulsed input radiations the energy indication means is preferred.

The response of the apparatus described above to transients has a much shorter time constant than would normally be the case for the thermal feedback loop, since it is not dependent upon maintaining a perfect null condition. So long as the value of $(X-0.5)$ is much less than 1.0 there is assurance of substantially linearity between magnetization and phase fraction; i.e. that $(\Delta M/\Delta X)$ is substantially a constant.

The minimum radiation pulse which is detechable by the apparatus described above is determined by the minimum detectable change in the magnetization of the detector 14. This value is dependent upon the manner in which a magnetization change is converted to an output voltage and ultimately upon the Johnson noise in the circuit. This is calculable for a particular detector by Equation 1.

For steady state radiation power inputs similar considerations apply and the measurement of the time rate of change of magnetization is similarly limited by noise considerations.

Figure 4:
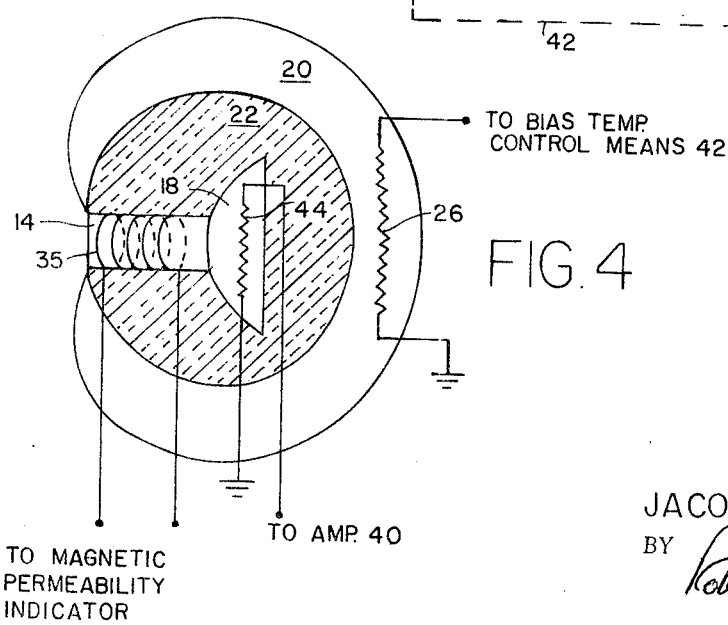
FIG. 4 is a schematic cross-section view of a pyromagnetic detector element according to the principles of the present invention.

FIG. 4 illustrates in cross section an alternative embodiment of a detector element, auxiliary and main heating means which may be employed to advantage in the practice of the present invention and wherein like elements are identified by like numerals. This assembly provides a more efficient means of maintaining the detector 14 at a more even bias temperature. The detector 14 is again in highly efficient heat transfer relation with the auxiliary heating means 18. The detector 14 and auxiliary heating means 18 are surrounded except for the radiation incident portion of the detector by generally concentric hyper-hemispheres of insulation material 22 and main heating means 20.

Figure 5:
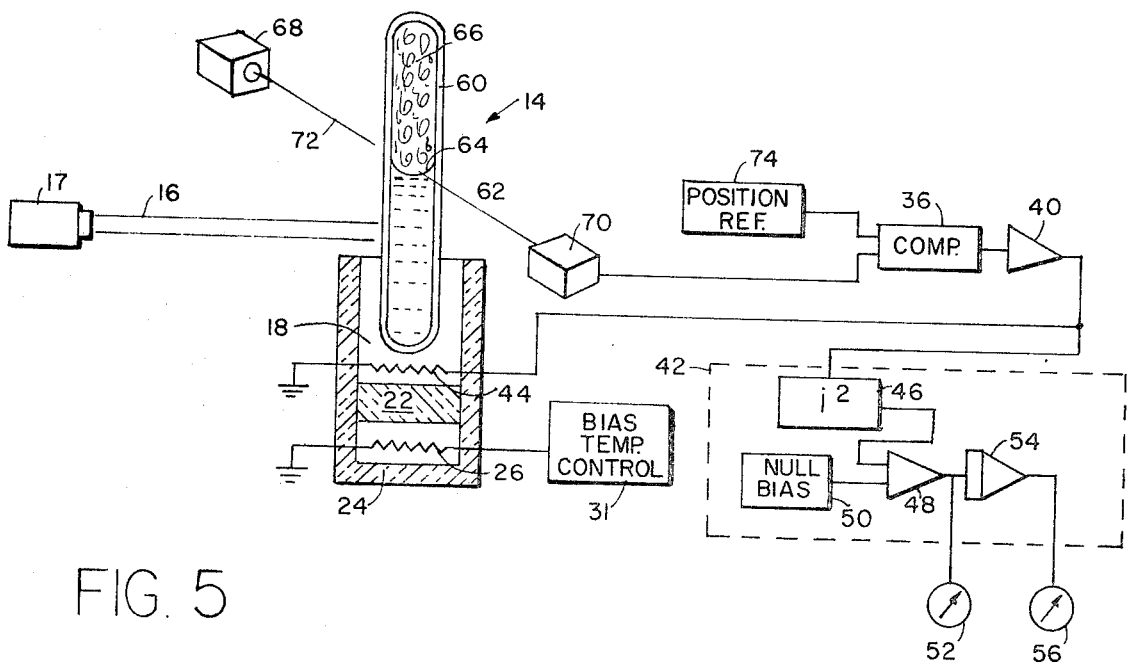
FIG. 5 is a schematic diagram of an embodiment of the present invention having a liquid-vapor detector element.

As stated hereinabove the pyromagnetic detector embodiment of the present invention has been described as an illustrative example. There are other detectors which undergo phase transitions in response to impingent radiation. For example, a gas-liquid phase transition within a sealed tube may be monitored by measuring meniscus height. Apparatus for accomplishing this is shown in FIG. 5 wherein elements as shown in FIG. 3 are identified with like numerals.

A sealed tube detector element 60 is provided which is partially filled with a liquid 62. The volume of the tube 60 above the meniscus 64 is filled with the vapors 66 of the liquid 62. When radiant energy 16 from a remote source 17 is impingent upon the tube 60 there is an inflow of heat to the liquid 62 which results in vaporization of a portion thereof. This liquid-gas phase transition in response to the impingent energy results in a measurable change in the height of the meniscus 64. This change in height indicates a change in the volume or fraction of the liquid which is in the vapor or gas phase. The meniscus height may be monitored by a light source 68 and a detector 70 disposed with respect to the tube 60 such that light rays 72 from the source 68 pass through the tube 60 at the level of the meniscus. A bias temperature control means 31 is used to maintain the temperature of the tube 60 such that the phase fraction; i.e. the percentage of the tube volume in the gas phase is at a preselected value. The output of the detector 70 is thus indicative of meniscus position or height. The detector 70 output is compared with a position reference source 74 in a comparator 36. The remainder of the signal processing means 42 and indicating means 52 and 56 are the same in function and operation as described hereinabove with reference to FIG. 3.

By the foregoing means the meniscus height is maintained at a level corresponding to a phase fraction of 0.5; i.e. 50% of the tube volume is in the vapor phase and 50% is in the liquid phase. The inflow of heat into the detector is then established by the relationship given in Equation 1, however, the $\Delta M$ term is replaced by $\Delta V$ which is the change in the vapor volume.

Figure 6:
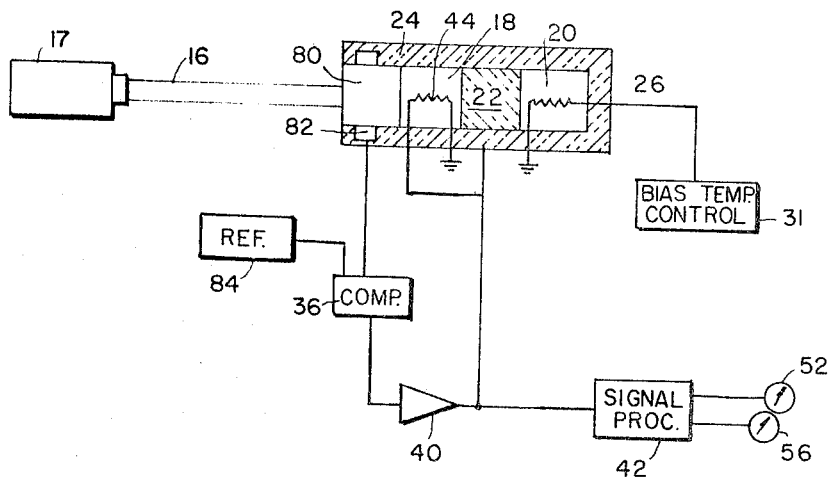
FIG. 6 is a schematic diagram of an embodiment of the present invention having a ferroelectric detector element.

Another example of a thermodynamic system useful as a detector element in the practice of the present invention is the ferroelectric class of materials typified by barium titanate wherein the electric field varies with the dipole moment phase fraction. Again, as illustrated in FIG. 6 the ferroelectric detector element 80 is placed in a temperature regulator circuit and maintained at a temperature corresponding to a preselected phase fraction. Radiant energy 16 from a remote source 17 which is incident upon the detector element 80 results again in an inflow of heat to the detector and a change in the dipole moment of the detector element. The dipole moment is sensed by suitable means such as an electrometer 82 the output of which is coupled to a comparator means 36 where it is compared with a dipole moment reference source 84. The comparator output is then coupled to signal processing means 42 as described hereinabove with reference to FIGS. 3 and 5.

Again the heat inflow to the detector element is determined by Equation 1 wherein the $\Delta M$ term is merely replaced by $\Delta P$ which is the change in the dipole moment.

It will thus be seen that the objects set forth hereinabove, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described what is new and novel and desired to secure by Letters Patent, what is claimed is:

1. Apparatus for measuring energy related properties of radiant energy comprising:
  a pyromagnetic detector element having a magnetization which undergoes a phase transistion in response to a change in the temperature thereof,
  means for thermally biasing said detector element such that the phase fraction thereof is maintained at a substantially constant preselected value,
  means for directing radiant energy such that it is impingent upon said detector element and provides an inflow of heat thereto,
  means coupled to said detector element for detecting a change in said magnetization due to heating thereof by said radiant energy, and
  signal processing means coupled to said detecting means and providing an output signal representative of said energy related property of said radiant energy.

2. Apparatus for measuring energy related properties of radiant energy comprising:
  a sealed tubular chamber filled with a material which is partially in a liquid phase and the remainder in a vapor phase and having a meniscus height which varies in response to a change in the temperature thereof,
  means for thermally biasing said chamber such that the phase fraction of said material is maintained at a substantially constant preselected value,
  means for directing radiant energy such that it is impingent upon said chamber and provides an inflow of heat thereto,
  means for detecting a change in said meniscus height due to heating thereof by said radiant energy, and
  signal processing means coupled to said detecting means and providing an output signal representative of said energy-related property of said radiant energy.

3. Apparatus for measuring energy related properties of radiant energy comprising:
  a two phase ferroelectric detector element having a dipole moment which undergoes a second order phase transition in response to a change in the temperature thereof,
  means for thermally biasing said detector element such that the phase fraction thereof is maintained at a substantially constant preselected value,
  means for directing radiant energy such that it is impingent upon said detector element and provides an inflow of heat thereto,
  means coupled to said detector element for detecting a change in said dipole moment due to heating thereof by said radiant energy, and signal processing means coupled to said detecting means and providing an output signal representative of said energy-related property of said radiant energy.

References Cited

UNITED STATES PATENTS

| | | |
|---|---|---|
| 2,189,122 | 2/1940 | Andrews. |
| 2,640,089 | 5/1953 | Gilbert _____ 73—361 XR |
| 2,932,743 | 4/1960 | Atwood _____ 73—355 XR |
| 3,239,783 | 3/1966 | Yetter _____ 317—133 XR |
| 3,434,349 | 3/1969 | Frischmann _____ 73—361 |

OTHER REFERENCES

Callen, H. B.: Thermodynamics, p. 173, Wiley, New York, Copyright 1960.

LOUIS R. PRINCE, Primary Examiner

F. SHOON, Assistant Examiner

U.S. Cl. X.R.

73—355